(12) United States Patent
Heaphy et al.

(10) Patent No.: US 10,724,559 B2
(45) Date of Patent: Jul. 28, 2020

(54) HAMMERLESS PIN ASSEMBLY

(71) Applicant: ESCO Corporation, Portland, OR (US)

(72) Inventors: Paul Heaphy, Wellington Point (AU);
Michael Dare, Brighton (AU); Junbo Qian, Westlake (AU)

(73) Assignee: ESCO GROUP LLC, Portland, OR (US)

(*) Notice: Subject to any disclaimer, the term of this patent is extended or adjusted under 35 U.S.C. 154(b) by 1005 days.

(21) Appl. No.: 14/838,900

(22) Filed: Aug. 28, 2015

(65) Prior Publication Data

US 2016/0061239 A1 Mar. 3, 2016

Related U.S. Application Data

(60) Provisional application No. 62/043,963, filed on Aug. 29, 2014.

(51) Int. Cl.
*E02F 3/58* (2006.01)
*F16B 3/04* (2006.01)
*E02F 3/48* (2006.01)

(52) U.S. Cl.
CPC .............. *F16B 3/04* (2013.01); *E02F 3/48* (2013.01); *E02F 3/58* (2013.01)

(58) Field of Classification Search
CPC ...... E02F 3/48; E02F 3/58; F16B 3/04; F16B 35/005; F16G 15/04; Y10T 16/05; Y10T 16/082; Y10T 403/32893; A44C 5/02; A44C 5/10; A44C 5/107; F16C 11/045
USPC ......... 403/79, 156, 157, 315, 316, 317, 318, 403/319, 320, 321, 324, 325, 326, 328, 403/154; 411/209, 315, 325, 393; 59/93; 37/456, 457; 24/573.09, 595.1, 630–632, 24/653, 654, 698.2, DIG. 31, DIG. 37, 24/DIG. 53, DIG. 58

See application file for complete search history.

(56) References Cited

U.S. PATENT DOCUMENTS

| | | | |
|---|---|---|---|
| 2,487,084 A | 11/1949 | Weiss | |
| 2,627,423 A | 2/1953 | Copeman | |
| 4,068,960 A * | 1/1978 | Swager | F16G 15/06 403/20 |
| 4,102,124 A * | 7/1978 | Swager | F16G 15/06 403/154 |
| 4,134,255 A * | 1/1979 | McBain | F16G 13/00 59/78 |
| 4,145,874 A * | 3/1979 | Muller | F16G 15/06 59/86 |
| 4,337,614 A * | 7/1982 | Briscoe | F16G 15/06 411/518 |

(Continued)

FOREIGN PATENT DOCUMENTS

| | | |
|---|---|---|
| RU | 2486377 | 6/2013 |
| WO | WO 2013/090996 | 6/2013 |

*Primary Examiner* — Joshua T Kennedy
(74) *Attorney, Agent, or Firm* — Palmer Dzurella (57) ABSTRACT

A pin assembly component for earth working equipment comprises a body including at least one opening into which a pin is received to couple the pin assembly component to at least one other part. A hole extends transverse to and communicating with the opening. A hammerless lock is secured in the hole and is adjustable to alternatively retain the pin in the opening and release the pin to permit installation and removal of the pin from the opening. The lock is retained to the body in the hole when holding the pin and when releasing the pin.

7 Claims, 7 Drawing Sheets

(56) References Cited

U.S. PATENT DOCUMENTS

| | | | | |
|---|---|---|---|---|
| 4,512,381 A * | 4/1985 | Alvarez | B25G 3/26 | |
| | | | 30/340 | |
| 4,597,499 A * | 7/1986 | Hanula | B61G 7/10 | |
| | | | 213/50.5 | |
| 5,286,130 A * | 2/1994 | Mueller | B66C 1/66 | |
| | | | 294/215 | |
| 5,367,798 A * | 11/1994 | Hughes | E02F 3/60 | |
| | | | 37/397 | |
| 5,865,557 A * | 2/1999 | Kasim | E02F 3/58 | |
| | | | 403/157 | |
| 5,966,849 A * | 10/1999 | Moehnke | E02F 3/58 | |
| | | | 172/719 | |
| 5,983,534 A * | 11/1999 | Robinson | E02F 9/2841 | |
| | | | 37/452 | |
| 6,098,434 A * | 8/2000 | Liou | B60R 25/086 | |
| | | | 70/360 | |
| 6,328,188 B1 * | 12/2001 | Boznos | A44C 5/107 | |
| | | | 224/164 | |
| 7,554,041 B2 * | 6/2009 | Ducret | H02G 3/0691 | |
| | | | 16/2.1 | |
| 7,587,791 B2 * | 9/2009 | Liou | B25B 23/0035 | |
| | | | 16/422 | |
| 7,730,824 B1 * | 6/2010 | Black | F41A 23/02 | |
| | | | 42/94 | |
| D645,884 S * | 9/2011 | Attwood | D15/21 | |
| 8,104,988 B2 * | 1/2012 | Lunn | F16G 15/06 | |
| | | | 403/154 | |
| D653,679 S * | 2/2012 | Attwood | D15/21 | |
| 8,156,846 B2 * | 4/2012 | Chi | B25B 23/0028 | |
| | | | 81/177.85 | |
| 8,171,715 B2 * | 5/2012 | Segura | B66C 1/10 | |
| | | | 59/78 | |
| 8,381,363 B2 * | 2/2013 | Boeckman | F16G 15/06 | |
| | | | 24/132 WL | |
| 8,408,094 B2 * | 4/2013 | Chen | B62M 3/08 | |
| | | | 74/594.1 | |
| 8,469,622 B2 * | 6/2013 | McClanahan | E02F 3/58 | |
| | | | 403/154 | |
| 8,807,901 B1 | 8/2014 | Lombardo et al. | | |
| 9,086,118 B2 * | 7/2015 | Campbell | F16G 15/06 | |
| 9,163,378 B2 | 10/2015 | Doan et al. | | |
| 9,624,966 B1 * | 4/2017 | Obleman | F16C 11/04 | |
| 2002/0023375 A1 * | 2/2002 | Pippins | E02F 9/2833 | |
| | | | 37/457 | |
| 2002/0162426 A1 * | 11/2002 | Lee | B25B 23/0035 | |
| | | | 81/177.85 | |
| 2005/0132532 A1 * | 6/2005 | Campbell | E05D 15/0682 | |
| | | | 16/2.4 | |
| 2010/0098484 A1 * | 4/2010 | Chen | B62M 3/08 | |
| | | | 403/321 | |
| 2013/0091746 A1 * | 4/2013 | Carpenter | E02F 9/28 | |
| | | | 37/456 | |
| 2013/0185895 A1 * | 7/2013 | Daniel | F41C 27/00 | |
| | | | 16/2.1 | |
| 2015/0007464 A1 | 1/2015 | Simpson et al. | | |
| 2016/0317849 A1 * | 11/2016 | Cowell | A62B 35/0068 | |
| 2019/0153703 A1 * | 5/2019 | Hyde | E02F 9/2808 | |

\* cited by examiner

HAMMERLESS PIN ASSEMBLY

FIELD OF THE INVENTION

The present invention relates to pinned connections used to join components that rotate about the pin axis relative to each other for earth working applications.

BACKGROUND OF THE INVENTION

Pins are commonly used to join components that rotate in relation to each other. A pin passes through openings in each of the components and is retained by mechanical means such as friction or by use of a retainer(s) on the pin or component. The openings and the pin surface form bearing surfaces as the component pivots.

Figure 1:
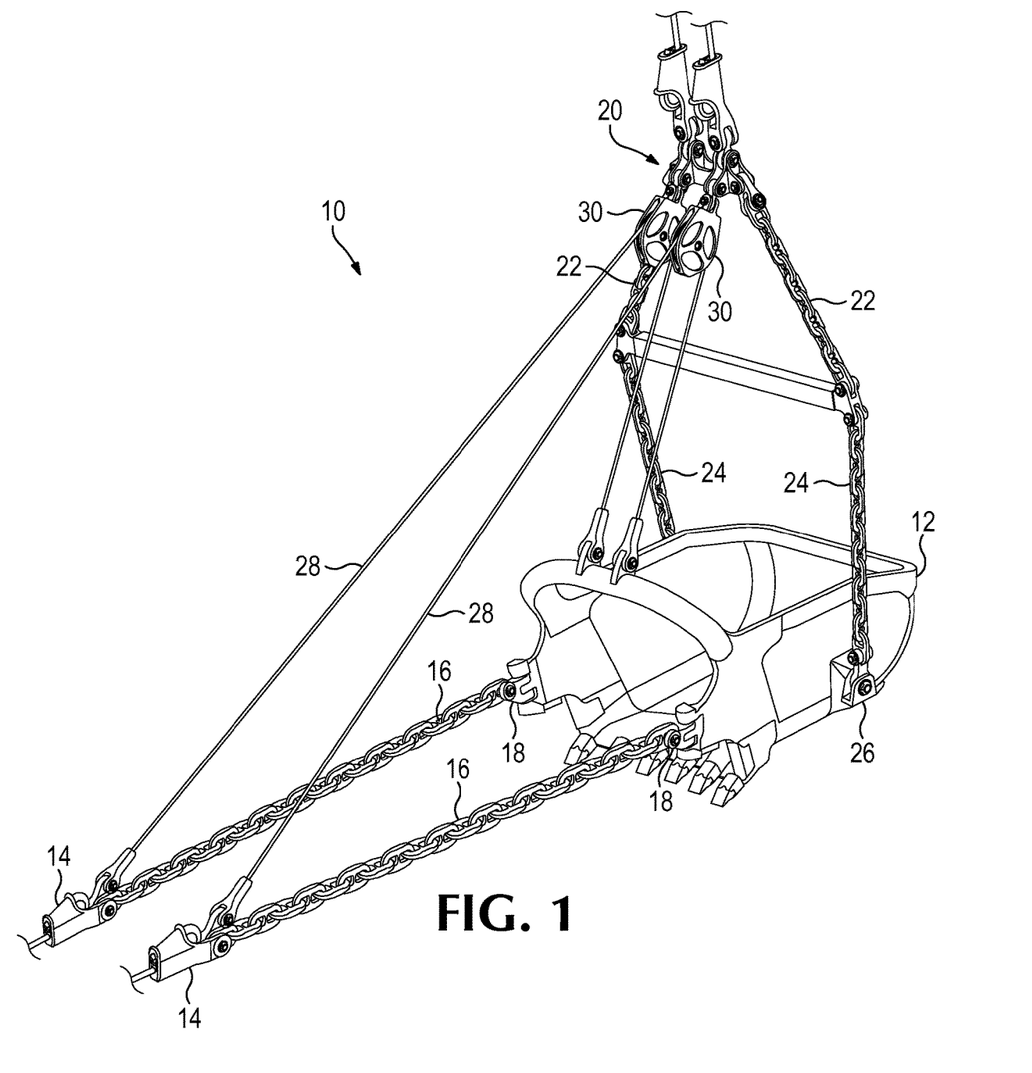
FIG. 1 is a perspective view of rigging for a dragline bucket.

Mining equipment uses pins extensively to join very large components used in highly abrasive environments. FIG. 1 shows a dragline bucket system 10 used in open pit mining operations with rigging for moving the bucket. The rigging handles extreme loads in pulling the bucket to collect earthen material and lifting the filled bucket. The bucket 12 is pulled forward by drag chain 16 attached to hitch 18 on the front of the bucket by drag links 14. Teeth on the lower lip engage and initially gather the earthen materials into the bucket.

Once filled, the bucket is lifted by cables connected to an upper hoist rigging assembly 20 connected to the bucket by upper hoist chains 22 and lower hoist chains 24 to trunnions 26 of the bucket. Once lifted off the ground the bucket can be repositioned to a dump site for spoiling material. When tension is released on the drag link, the dump cable 28 passing through the dump block 30 releases allowing the bucket to rotate about the trunnion point well back of the center of gravity and tip forward so that the earthen materials are dumped from the bucket. The connections between the cables, chains and the bucket include one or several pins to secure the components to adjacent components.

In aggressive environments, the pins and the components wear quickly and require frequent replacement. Dirt, rocks, and other debris abrade the dragline bucket and the rigging as they contact or slide against the ground. Connections between the various elements also experience wear in areas where surfaces of the elements bear against each other and are subjected to tensile, compressive, or various other forces. Following a period of use, therefore, portions of the dragline excavating system are subjected to maintenance to permit worn or otherwise damaged elements to be inspected, repaired, or replaced.

Rigging components for dragline mining vary in size and weight. The dump block can weigh several thousand pounds, and the pins and links of the chain can each weigh several hundred pounds. Replacing the pins can require heavy lifting equipment for each component and each component has to be aligned for the pin to be removed or installed. The installation operation can be hazardous for the installers. Cutting away and reattaching retention plates that often retain the pins can be time consuming and expensive.

A pin assembly that can be installed with less handling and processing while incurring fewer hazards to the operators would be advantageous.

SUMMARY

Pinned connections are used in a wide variety of excavating equipment, but may be used in a variety of earth working environments, including a wide range of mining, dredging, forestry, and construction equipment as well. The pin assembly of the present invention reduces the handling of the components, the time required for installing and removing pins from equipment, and the downtime required for maintenance.

In one example, pinned connections or pin assemblies are used in mining. Mining equipment operates in extremely abrasive environments with dust and debris that penetrate every crevice. Even components that are not intended to contact the earthen materials are affected by the sand and dust generated during processing.

In an alternative embodiment, a pin assembly component for earth working equipment comprises a body including at least one opening into which a pin is received to couple the pin assembly component to at least one other part. A hole extends transverse to and communicating with the opening. A hammerless lock is secured in the hole. The lock is adjustable to alternatively retain the pin in the opening and release the pin to permit installation and removal of the pin from the opening. The lock is retained to the body in the hole when holding the pin and when releasing the pin.

In an alternative embodiment, a pin assembly component for earth working equipment comprises a body including a pair of arms each of which includes an opening where the openings are aligned with each other to define a passage for receiving a pin to couple the pin assembly component to another part. A hole extends transverse to the passage communicating with one of said openings. A lock including a threaded collar is secured within the hole. A threaded lock pin is threadedly received into the collar such that the pin can be advanced to contact the pin to retain the pin in the openings and retracted to permit installation and removal of the pin.

In an alternative embodiment, a pin assembly component for earthworking equipment comprises first and second arms each with an opening where the openings are aligned. A hole defined by a wall extends through the arm from an exterior arm surface to the opening to receive a lock to hold a pin in the openings, the wall defining the hole including a retaining structure between the arm surface and the opening. The retaining structure has an upper shoulder and a lower shoulder for contacting corresponding bearing surfaces on the lock to positively hold the lock in the hole against inward and outward forces on the lock.

In an alternative embodiment, a pin assembly component for use with excavating equipment comprises an arm with an aperture and a hole defined by a wall extending through the arm and opening in both a surface of the arm and the aperture to receive a lock to hold a pin in the aperture. The wall defining the hole includes a retaining structure between the arm surface and the aperture. The retaining structure has an upper bearing surface and a lower bearing surface for contacting corresponding bearing surfaces on the lock to positively hold the lock in the hole against inward and outward forces on the lock. The wall defines a slot adjacent the retaining structure and extending along the length of the hole from the arm surface toward the aperture to permit a lock component of a unified construction to be installed in the hole and contact the upper shoulder and the lower shoulder.

In an alternative embodiment, a pin assembly component for earthworking equipment comprises a body with a pair of extending arms, each arm having an opening, the openings being aligned to receive a pin. A hole in one arm extends from an exterior arm surface to the opening with a lock installed in the hole. The lock includes a one-piece mounting component mechanically secured in the hole to resist movement of the mounting component in both inward and outward directions in the hole. The lock also includes a holding component movable in the mounting component between a release position where the pin can be received in the openings and removed from the openings of the coupling body and a locked position where the pin is secured to the coupling body.

In an alternative embodiment, a pin assembly component for earthworking equipment comprises a structure for receiving a pin and a hole defined by a wall. The wall includes a retaining structure having an upper shoulder and a lower shoulder. A collar in the hole includes lugs to straddle the retaining structure and contact the upper and lower shoulders to resist movement of the collar in both inward and outward direction in the hole, and a threaded opening. A threaded lock pin is received in the threaded opening for movement between a release position where the pin can be installed in and removed from the structure, and a locked position where the pin is secured to the structure.

The pin assembly reduces the risk to the operator installing the pin to the components, provides for reduced wear of the components during operation, and limits wear.

In one inventive concept of the present invention, the lock is integral to the component and remains in a passage of the component during removal and installation of the pin.

In another inventive concept of the present invention, body includes an aperture for receiving a pin and a hole through the body opening to the aperture. The hole retains an integrated lock that moves between a locked position extending into the pin opening and an unlocked position retracted from the pin opening.

In another inventive concept of the present invention, a component incorporates a lock that extends from a hole into a recess of a pin to retain the pin in the component. The lock is retained in the body of the component in both the extended and retracted positions.

In another inventive concept of the present invention, a pin is secured by a lock that includes a detent to positively secure the lock in a retained position where the pin is held in the assembly and a release position where the pin can be installed or removed from the assembly.

In another inventive concept of the present invention, a pin is secured by a lock that includes a threaded collar mechanically fixed to one component and a threaded lock pin received within the collar and movable between a retained position and a release position.

The different inventive concepts can be used independently without the other inventive concepts in a pin assembly to achieve one or more of the various benefits of the present invention.

DETAILED DESCRIPTION OF THE PREFERRED EMBODIMENTS OF THE INVENTION

Mining operations require large and heavy rigging to handle drag buckets and other equipment used in open pit mines. The rigging uses pins extensively to hold many of the components together. In operation, these pins are exposed to abrasive particles that infiltrate any gap in the assemblies. These particles, combined with the extreme loads seen by the pins, limit the service life of the components by eroding exposed and mating surfaces until the components are not serviceable. Refurbishing the rigging requires handling parts weighing tons and aligning combinations of parts to accommodate the assembly and disassembly of the pins from the components. Handling these large parts can be dangerous for the operators and can take the equipment out of service for long periods. The mining application is used as an example to describe preferred embodiments of the invention. Pin assembly embodiments of the invention are usable in other earth working operations.

Figure 2:
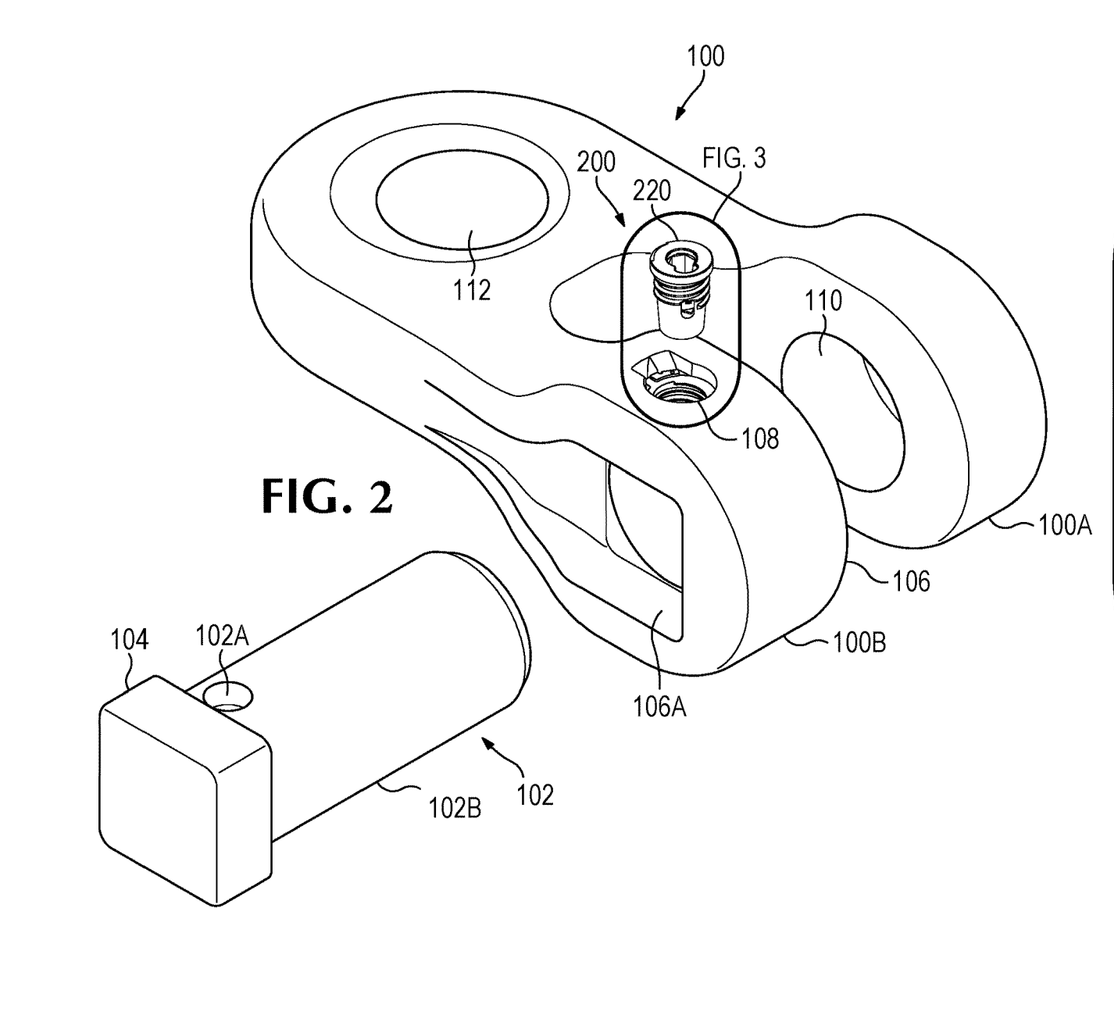
FIG. 2 is a perspective exploded view of a rigging wear component as a y-link with a pin received by the link.
Figure 3:
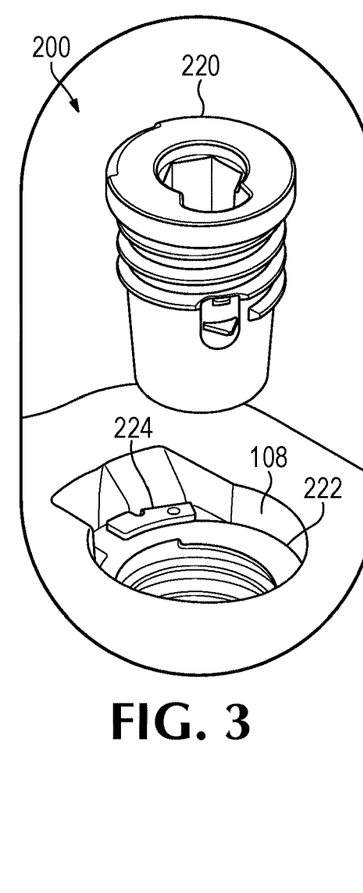
FIG. 3 is a detail view of a lock of FIG. 2.
Figure 4:
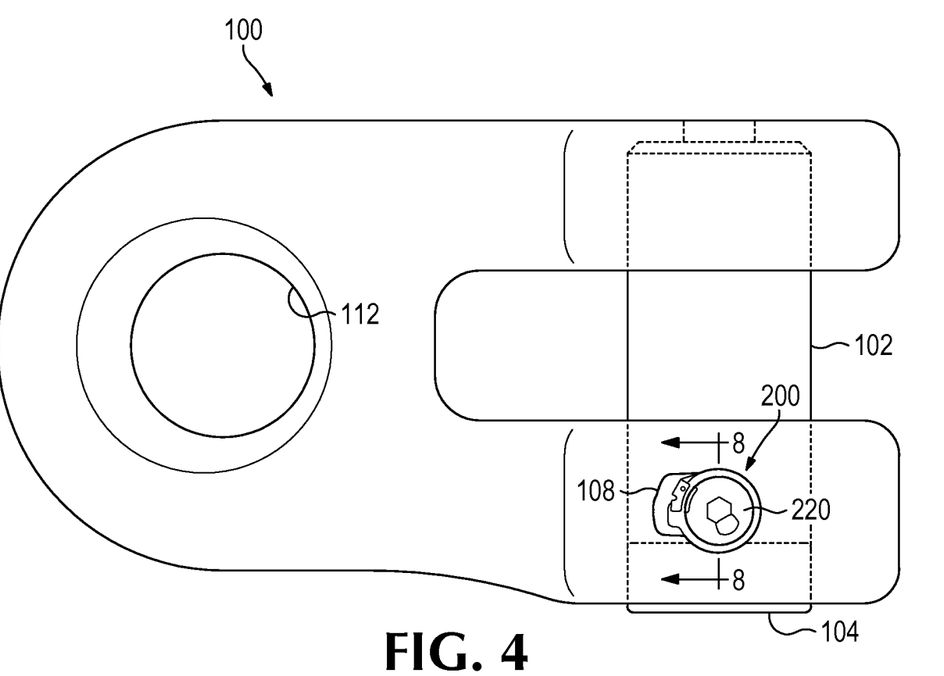
FIG. 4 is a top view of the link of FIG. 2.
Figure 5:
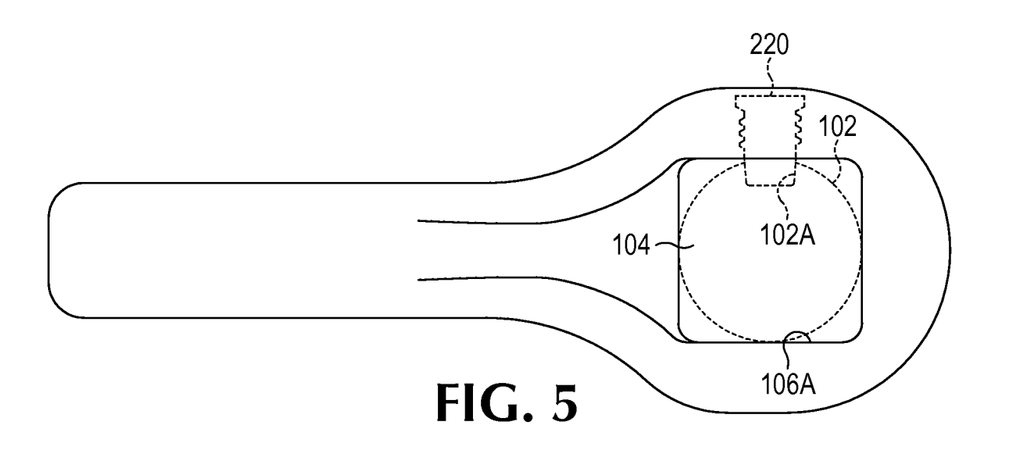
FIG. 5 is a side view of the link of FIG. 2.
Figures 6, 7:
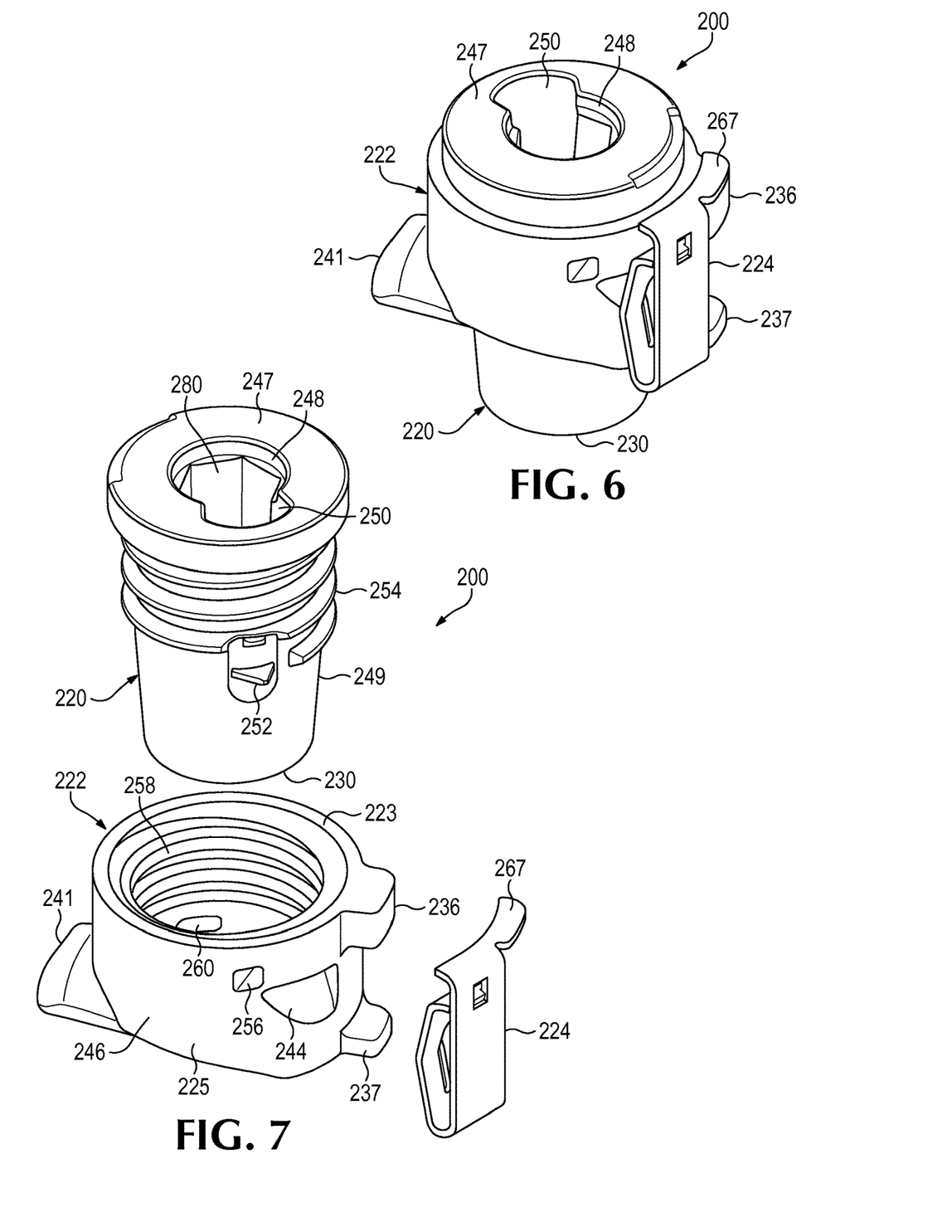
FIG. 6 is a perspective cross section view of the lock assembly.
FIG. 7 is a perspective exploded view of the lock.
Figure 8:
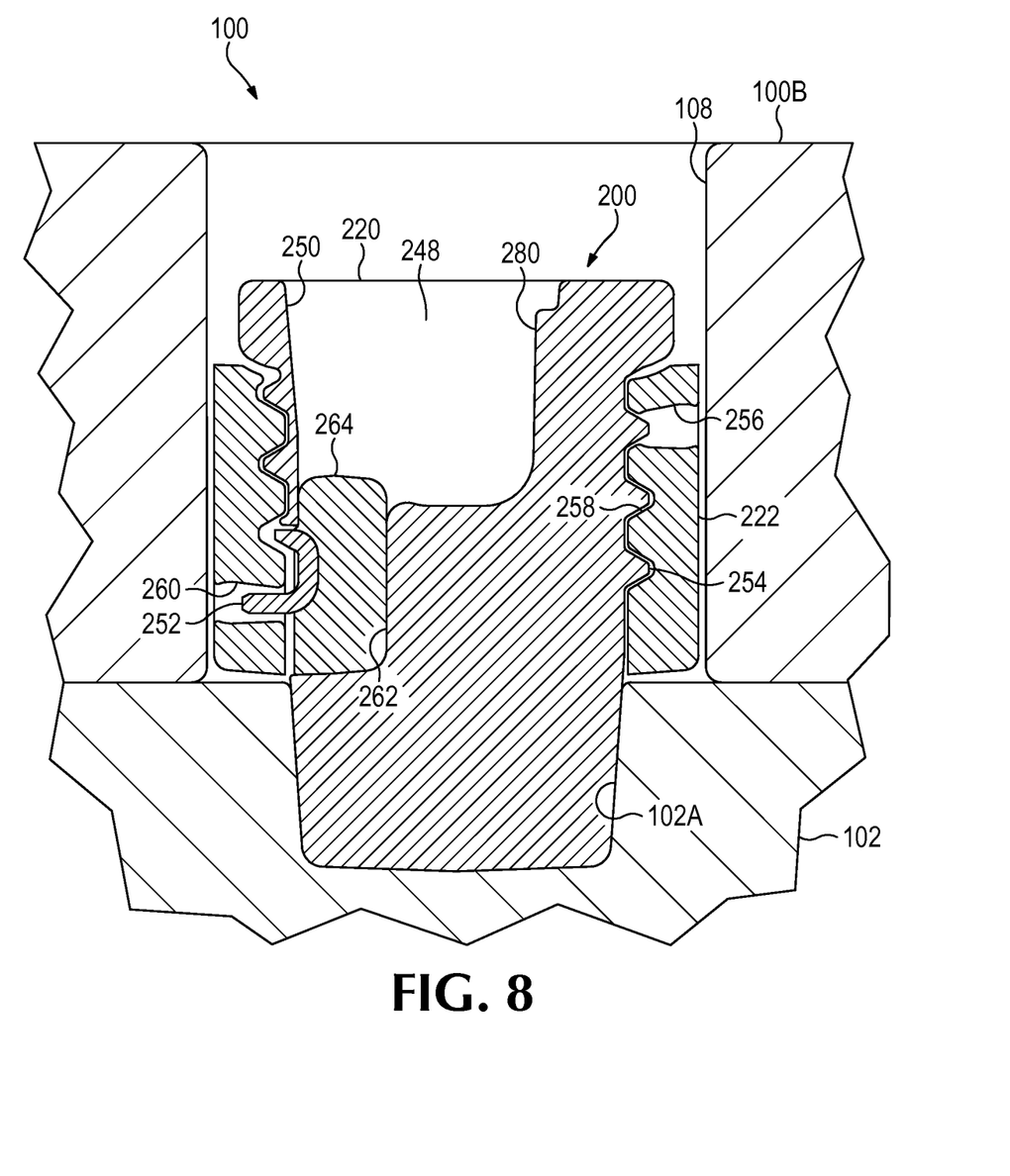
FIG. 8 is a cross-sectional view from section 8-8 in FIG. 4 of the lock installed in the link.

A pin assembly that provides more efficient installation and extraction of the pin is generally shown in FIGS. 2-12. A Y-link is a common rigging wear component for connecting different components as shown in FIG. 2 and is used herein as an example. Y-link 100 includes a body with arms 100A and 100B extending in the same general direction. Each arm has an opening or aperture 106 and 110. In this example, another rigging component is received between arms 100A and 100B. An opening of another rigging component to be coupled to link 100 is generally aligned with and between openings 106 and 110. The aligned openings accept a pin 102 with a shaft or body 102B and a head 104 to join the components. The pin head 104 as shown is square and is received in recess 106A, though other shapes are possible. Head 104 can be flush or recessed from the outer face of the arm when installed. Pin 102, with a square head 104 received in a recess, is fixed and does not rotate freely in the openings during operation.

Link 100 includes an opening 112 for connecting another adjacent rigging component. Arm 100B includes a lock passage 108 extending generally transversely to the axis of the aligned openings 106, 110. The axis of the pin 102 aligns with this opening axis when inserted. Lock passage 108 includes retention features and the passage receives and retains lock 200.

Lock 200 is generally shown in FIGS. 6-12. Lock 200 is integrally installed in lock passage 108 so that it is retained in both the released position and the locked position. This allows the pin 102 to be maintained or replaced without handling the lock separately from the link. The rigging wear component can be disassembled and assembled without the lock being dropped or lost. This can significantly improve maintenance procedures and reduce downtime for excavating equipment. The inventive assembly reduces the need for separate handling of the lock. Moreover, searching for a dropped component at night can be difficult and can put personnel in a hazardous situation underneath heavy components.

Lock 200 is retained in lock passage 108 and when engaged to the pin 102 restrains axial movement of the pin in openings 106 and 110 to prevent loss of the pin. The lock includes a lock pin 220 received in a collar 222 mechanically retained in the link 100. The collar contains features supportive of integrated shipment, load transmission, lock installation and lock removal. The lock pin 220 and collar are preferably threaded so that pin 220 helically advances through the center of the collar 222 between two low energy positions created by an elastomer backed latching mechanism. The first position, (e.g., with a ½ turn of thread engaged between the collar and the pin) is a release position where the pin is preferably retained during shipment, storage, installation and removal. The lock pin 220 advances into the second low energy position after rotating (e.g., 2½ turns) ending preferably in a hard stop signaling that the system is locked. When the link pin 102 requires removal, the lock pin 220 is rotated counter-clockwise to retract the lock pin. In a preferred construction, pin 102 includes a recess 102A in pin shaft 102B that receives at least a portion of the lock pin to hold the pin in place, and from which the lock pin is retracted to allow the pin 102 to slide free from openings 106 and 110 in link 100. Other arrangements to facilitate effective engagement of the lock pin and the pin could be used.

Lock 200 includes a mounting component or collar 222 and a retaining component or lock pin 220 (FIGS. 6, 7, 8 and 12). Collar 222 fits in passage 108 of link 100 and includes a bore or opening 223 with threads 258 for receiving lock pin 220 with matching threads 254. A retainer 224, preferably in the form of a retaining clip, is inserted in passage 108 with collar 222 to prevent disengagement of the collar 222 from link 100. Preferably, retainer 224 is inserted during manufacture of link 100 so that lock 200 is integrally coupled with link 100 (i.e., to define a link that integrally includes a lock) for shipping, storage, installation and/or use of the link. Such a construction reduces inventory and storage needs, eliminates dropping the lock during installation (which can be particularly problematic at night), ensures the proper lock is always used, and eases the installation of the link. Although the lock is preferably always retained in the component, retainer 224 could be made to be removable to permit removal at any time so as to effect removal of lock 200.

Collar 222 has a cylindrical body 225 with lugs 236, 237 that project outward to contact and bear against bearing surfaces of retaining structure 202 to hold lock 200 in place in link 100. To install collar 222, body 225 is inserted into passage 108 from within opening 106 such that lugs 236, 237 are slid along passage 108. Collar 222 is preferably translated into passage 108 until flange 241 is received in passage 108. Collar 222 is then rotated until lugs 236, 237 straddle retaining structure 202. The rotation of collar 222 is preferably approximately 30 degrees so that lugs 236, 237 move into upper reliefs 204, 206. The engagement of lugs 236, 237 against both sides of retaining structure 202 hold collar 222 in passage 108 even under load during digging. Further, the cooperation of outer lug 236 and flange 241 provide a resistive couple against cantilever loads applied to lock pin 220 during use.

Once collar 222 is in place, a retainer or clip 224 is inserted into passage 108 from outside link 100. Preferably, retainer 224 is snap-fit into a slot 210 along passage 108, thereby preventing rotation of collar 222 so that lugs 236, 237 are retained in reliefs 204, 206. Retainer 224 is preferably formed of sheet steel with a bent tab 242 that snaps into a receiving notch 244 on an outer surface 246 of collar 222 to retain retainer 224 in link 100. The retainer allows collar 222 to be locked in link 100 for secure storage, shipping, installation and/or use, and thereby define an integral part of link 100. A flange 267 is preferably provided to abut lug 236 and prevent over-insertion of the retainer.

Figure 9:
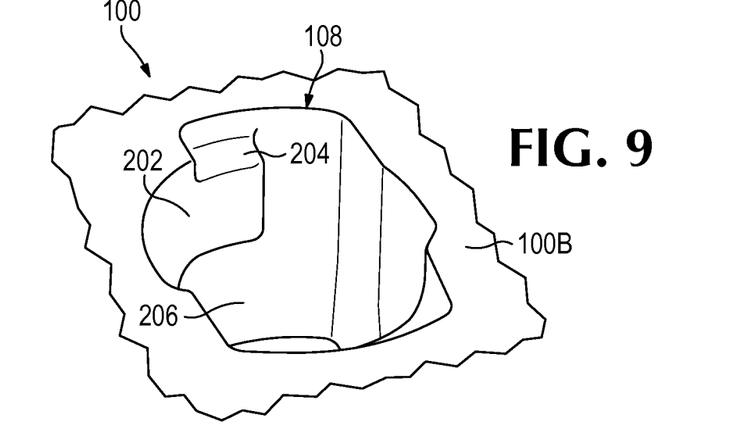
FIG. 9 is a partial perspective view of the lock passage in the arm of the link.
Figure 10:
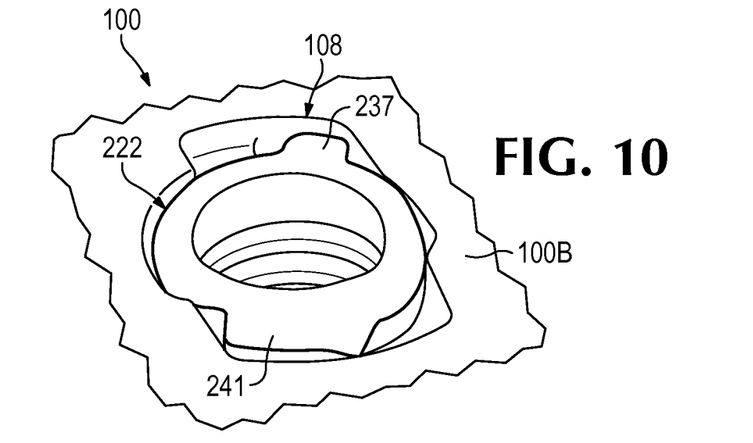
FIG. 10 is a partial perspective view of the lock passage of FIG. 9 with the mounting component of the lock partially installed.
Figure 11:
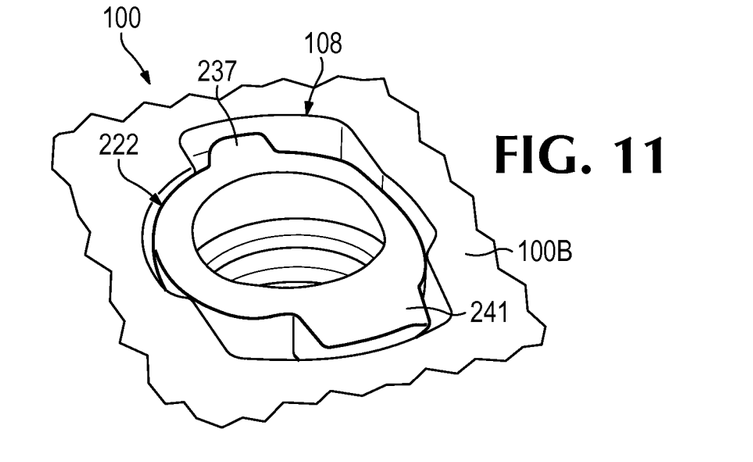
FIG. 11 is a partial perspective view of the lock passage of FIG. 9 with the mounting component installed in the link.
Figure 12:
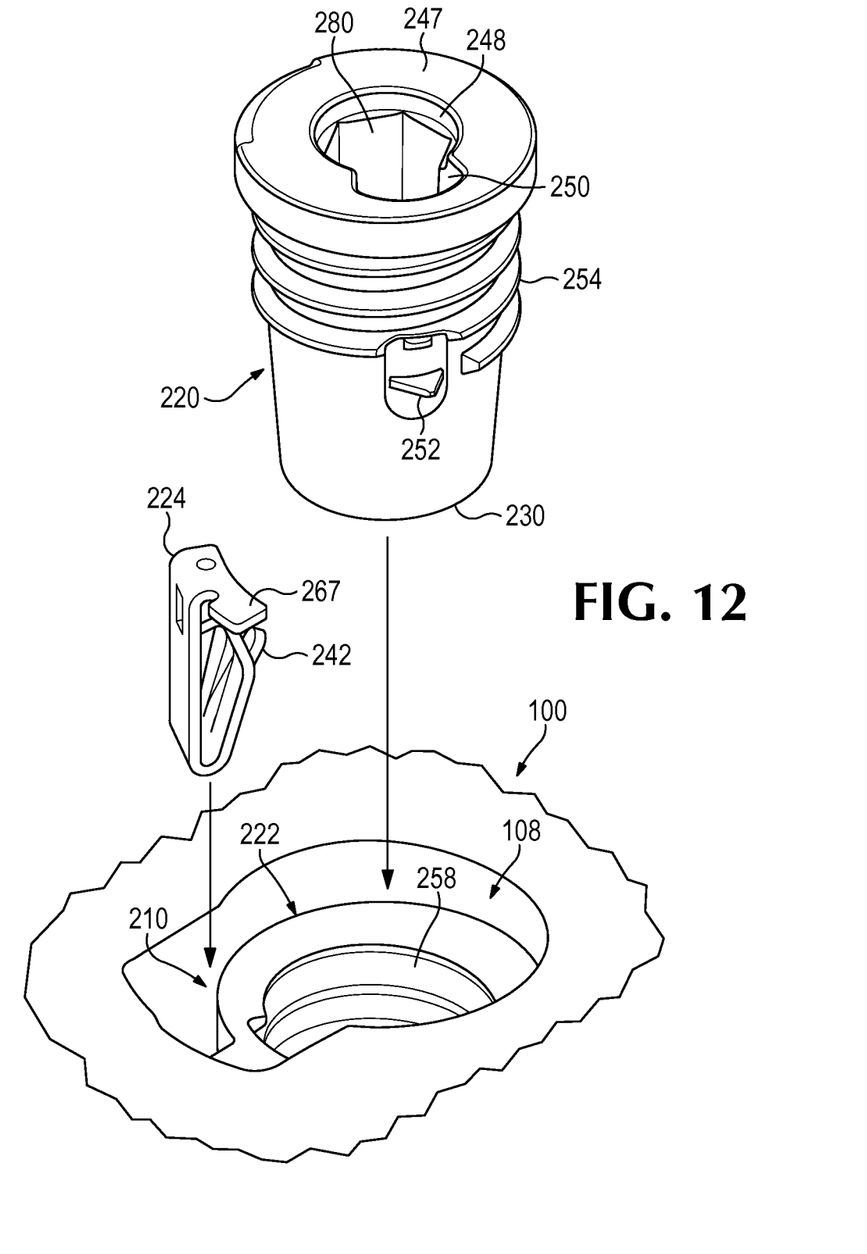
FIG. 12 is an exploded perspective view of a retainer, the lock and lock passage.

The engagement of lugs 236, 237 against retaining structure 202 mechanically hold collar 222 in passage 108 and effectively prevent inward and outward movement during shipping, storage, installation and/or use of link 100 (FIGS. 9-11). A mechanical attachment is preferred because the hard, low alloy steel commonly used to manufacture links for earth working equipment generally lacks sufficient weldability. Collar 222 is preferably a single unit (one piece or assembled as a unit), and preferably a one piece construction for strength and simplicity. Retainer 224 is preferably formed of sheet steel as it does not resist the heavy loads applied during operations. Retainer 224 is used only to prevent undesired rotation of collar 222 in passage 108 so as to prevent release of lock 200 from link 100. Nevertheless, other means for securing collar 222 in passage 108 could be used.

Lock pin 220 includes a head 247 and a shank 249. Shank 249 is formed with threads 254 along at least a portion of its length from head 247. Pin end 230 is preferably unthreaded for receipt into a hole 102A in pin 102. Lock pin 220 is preferably installed into collar 222 from outside link 100 so that pin end 230 is the leading end and pin threads 254 engage collar threads 258. A hex socket (or other tool-engaging formation) 248 is formed in (or on) head 247, at the trailing end, for receipt of a tool to turn lock pin 220 in collar 222.

Locks 200 are preferably used to secure pin 102 to link 100. In the preferred construction, one lock 200 holds pin 102 to link 100. Alternatively, two locks could be used to secure the pin to the wear component. Alternatively, the lock could engage the end surface of the pin to restrain the axial movement of the pin in only one axial direction. The other end could be blocked by conventional means or a second inventive lock. The locking system can retain a floating pin that is free to move in the openings. Pin 102 can be a cylindrical pin without a head. An annular recess can be machined near the end of the cylindrical pin that accepts the pin of the lock and limits movement of the pin axially in the opening but allows the pin to rotate axially. Other configurations can be used as well. One example of a lock 200 is illustrated here. The lock could have a wide variety of constructions that perform a similar function of limiting movement of the pin.

A Y-link is depicted here as an example only for the purpose of illustration. The inventive concept can be applied to a range of pinned components in addition to a Y-link. Pin 102 preferably includes a recess 102A that receives a portion of lock 200 to limit axial movement of pin 102 in the openings during operation. The recess to receive a portion of the lock can be located in the shaft 102B of the pin or in the head 104.

In one preferred embodiment, threaded lock pin 220 includes a biased latching tooth or detent 252, biased to protrude beyond the surrounding thread 254. A corresponding outer pocket or recess 256 is formed in the thread 258 of collar 222 to receive detent 252, so that threaded lock pin 220 latches into a specific position relative to collar 222 when latching detent 252 aligns and connects with outer pocket 256. The engagement of latching detent 252 in outer pocket 256 holds threaded lock pin 220 in a release position relative to collar 222, which holds lock pin 220 with sufficient clearance outside of recess 102A on pin 104. The lock pin is preferably shipped and stored in the release position so that link 100 is ready to install. Preferably, latching detent 252 is located at the start of the thread on threaded lock pin 220. Outer pocket 256 is located preferably approximately ½ rotation from the start of the thread on collar 222. As a result, lock pin 220 will latch into shipping position after approximately ½ turn of lock pin 220 within collar 222. Other arrangements are, of course, possible. The detent could alternatively be supported by the collar and fit into a recess in the locking pin.

Further application of torque to lock pin 220 will squeeze latching detent 252 out of outer pocket 256. An inner pocket or recess 260 is formed at the inner end of the thread of collar 222. When lock pin 220 is installed into collar 222, it is preferably rotated ½ turn to the release position for shipping, storage and/or installation of link 100. Lock pin 220 is then preferably rotated 2½ turns until pin end 230 is fully received into recess 102A in the locked or service position. More or fewer rotations of threaded lock pin 220 may be needed, depending on the pitch of the threads, and on whether more than one start is provided for the threads. The use of a particularly coarse thread requiring, e.g., only three full rotations of threaded lock pin 220 for full locking of a pin 102 to link 100 has been found to be easy to use in field conditions, and reliable for use under the extreme conditions of excavation. Furthermore, the use of a coarse helical thread is better in installations where the lock assembly will become surrounded by compacted fines during use.

Preferably, lock 200 is recessed in passage 108 so that it remains shielded from moving earthen material over the life of the link. Earthen material will tend to accumulate in passage 108 above lock 200 and protect the lock from undue wear even as link 100 wears. Further, the lock is generally centrally located in link 100 with pin end 230 located at or proximate the center of recess 102A in the locked position.

Pin 102 may be released using a ratchet tool or other tool to unscrew lock pin 220 from collar 222. While lock pin 220 can be removed from collar 222, it need only be backed up to the release position. Pin 102 can then be removed from link 100. The torque of unscrewing lock pin 220 may exert substantial torsion loads on collar 222, which loads are resisted by engagement with retaining structure 202, providing a strong and reliable stop for lugs 236 and 237.

The mounting component or collar 222 of lock 200 defines a threaded bore 223 for receiving the threaded securing lock pin 220 that is used to releasably hold pin 102 to link 100. The separate mounting component 222 can be easily machined or otherwise formed with threads, and secured within the link for less expense and higher quality threads as compared to forming the threads directly in the link. The steel used for link 100 is very hard and it is difficult to cast or otherwise form screw threads into passage 108 for the intended locking operation. The relatively large size of link 100 also makes it more difficult to cast or otherwise form screw threads in passage 108. The mounting component 222 can be mechanically held within the passage in the link to resist axial movement in either direction (i.e., that is in and out of passage 108) during use so as to better resist unintended loss of the lock during shipping, storage, installation and use. On account of the hard steel typically used for link 100, mounting component 222 could not be easily welded into passage 108. Nevertheless, threads or partial threads could be formed in channel 108 or the collar could be welded in channel 108.

The use of a lock in accordance with the present invention provides many benefits: (i) a lock integrated into a link so that the lock ships and stores in a ready to install position for less inventory and easier installation; (ii) a lock that requires only common drive tools such as a hex tool or ratchet driver for operation, and requires no hammer; (iii) a new lock provided with each wear part; (iv) a lock that is positioned for easy access; (v) a lock with a simple, intuitive and commonly understood operation; (vi) a lock integration system built around simple castable feature where the integration supports high loads, requires no special tools or adhesives and creates a permanent assembly.

While the application has described the invention primarily in terms of pins for joining components, the invention could also be employed in other applications where pins are used. It is believed that the disclosure set forth herein encompasses multiple distinct inventions with independent utility. While a lock for a pin has been disclosed in its preferred form, the specific embodiments thereof as disclosed and illustrated herein are not to be considered in a limiting sense as numerous variations are possible. While different configurations have been described to achieve a specific functionality, combinations of these configurations may be used and still fall within the scope of this disclosure. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

The invention claimed is:

1. A rigging component for earth working equipment comprising: a body including at least one opening into which a pin is received to couple the rigging component to at least one other part, and a hole extending transverse to and communicating with the opening; and a threaded lock pin secured in the hole and adjustable to alternatively retain the pin in the opening and release the pin to permit installation and removal of the pin from the opening, the threaded lock pin being retained to the body in the hole when holding the pin and when releasing the pin, wherein the threaded lock pin defines a pre-established hold position and pre-established release position and stops to releasably hold the threaded lock pin in both positions, and the stops are defined by a biased latch received into latch openings.

2. The rigging component in accordance with claim 1 including a threaded collar, wherein the threaded lock pin is threadedly received into the threaded collar.

3. The rigging component in accordance with claim 2 wherein one of the threaded collar and the threaded lock pin include at least one biased latch and the other of the threaded collar and the threaded lock pin include at least one latch opening to receive the latch to releasably retain the threaded lock pin in each of the hold and release positions wherein the stops are defined by the biased latch received into the at least one latch opening.

4. The rigging component in accordance with claim 1 wherein the body includes a pair of arms each of which includes one of the at least one opening such that two of the at least one opening are aligned with each other.

5. A pin assembly for excavating equipment comprising: a plurality of rigging components for excavating equipment, each of the components including at least one aperture and at least one of the components including a hole defined by a wall extending through the component and opening in both an exterior component surface and the aperture of the component; a pin received into the apertures; and a threaded lock pin received in the hole and movable to alternatively contact the pin to hold the pin in the apertures and release the pin from the apertures, wherein the wall defining the hole includes a retaining structure between the exterior component surface and the aperture, and the retaining structure having an upper shoulder and a lower shoulder for contacting corresponding bearing surfaces on a lock that includes the threaded lock pin to positively hold the lock in the hole against inward and outward forces on the lock.

6. A rigging component for excavating equipment comprising:
   a body including at least one opening into which a pin is received to couple the rigging component to at least one other part, a hole in the body extending transverse to and communicating with the opening, and a wall defining the hole that includes a retaining structure having an upper shoulder and a lower shoulder; and
   a lock including a collar with a threaded bore secured in the hole by engaging the upper and lower shoulders, and a threaded pin threaded in the threaded bore for adjustment between retaining the pin in the opening and permitting release of the pin.

7. The rigging component of claim 6 wherein the retaining structure contacts corresponding bearing surfaces on the collar, wherein the bearing surfaces are configured to positively hold the lock in the hole against inward and outward forces on the lock.

* * * * *